United States Patent Office 3,834,997
Patented Sept. 10, 1974

3,834,997
METHOD FOR THE SEPARATION OF ORTHO- AND PARA-DIHYDROXY BENZENE ISOMERS
Martin B. Hocking, Victoria, British Columbia, and Donald J. Intihar, Sarnia, Ontario, Canada, assignors to The Dow Chemical Company, Midland, Mich.
No Drawing. Filed July 14, 1972, Ser. No. 271,822
Int. Cl. C10g 1/24
U.S. Cl. 203—87                 6 Claims

ABSTRACT OF THE DISCLOSURE

A sublimation technique is utilized through the application of a vacuum and heat to obtain yields of the separate ortho- and para-dihydroxy isomers higher than those obtained by other recovery methods while at the same time being a method which is environmentally more attractive.

BACKGROUND OF THE INVENTION

Nuclear hydroxylation of phenolic compounds through the use of hydrogen peroxide, performic acids, etc., to produce polyhydroxybenzenes and the like, are known in the art. See, for example, U.S. Pat. 3,514,490 wherein pyrocatechol and hydroquinone are produced by oxidizing phenol with a saturated aliphatic peracid. Similarly, U.S. Pat. 3,580,956 describes the hydroxylation of aromatic compounds using hydrogen peroxide and a catalyst. A number of other references, to be taken up below, wherein catechol and hydroquinone, or simply a dihydroxybenzene yield, are produced from the oxidation of a phenolic compound have one thing in common with the two cited patents; separation of the dihydroxybenzenes entails at least two or more steps. Thus, in U.S. Pat. 3,514,490 separation of the diphenols is accomplished either by fractional distillation or by precipitation of the catechol as a lead salt and its subsequent regeneration after separation by the action of an acid. As will be shown below, these prior art methods of separation are not only more complex and time consuming, but they are less efficient as well.

SUMMARY OF THE INVENTION

We have now discovered a method whereby the ortho- and para-dihydroxy products of the oxidation of certain phenolic compounds may be separated from one another in one step from the crude reaction mixture and at the same time obtaining a significantly higher yield than that obtained by separation procedures formerly used.

The oxidation of phenolic compounds with hydrogen peroxide, using a ferric ion or ferric ion/catechol catalyst is quite selective resulting in only two main products—1,2-dihydroxy compound and a 1,4-dihydroxy compound. Thus, in the oxidation of phenol the two main products are catechol and hydroquinone. The products derived from the iron catalyzed hydrogen peroxide oxidation of cresols and hydroxy anisoles are the 1,2-dihydroxy methylbenzene and 1,4-dihydroxy methylbenzene for the cresols and 1,2-dihydroxy methoxybenzene and 1,4-dihydroxy methoxybenzene for the hydroxy anisoles. The sublimation technique herein described and claimed for the recovery and separation of the ortho- and para-dihydroxy compounds from the crude reaction mixture is notable for the significantly improved yields garnered thereby. Briefly, after reacting the phenolic compounds/iron solution with hydrogen peroxide, the solvent water and unreacted phenolic compounds are removed by steam distillation. Then the crude reaction concentrate is put under a vacuum and heated by an oil bath. Fitted to the flask containing the concentrate is a steam heated large bore reflux condenser in which the para-dihydroxy compound sublimes out. To the upper end of this condenser is fitted a vacuum trap cooled in a Dry Ice/acetone (cold water is adequate with moderately low pressure) in which the 1,2-dihydroxy compound sublimes out. By following a gentle heating regimen, these two main products are recovered from the concentrate at a high yield.

The purity of the starting phenolic compound is an unimportant factor. The hydrogen peroxide used can be in a concentration range of 1 to 100% $H_2O_2$, but 30% or higher concentrations give lower surplus water problems and lower than 50% gives a somewhat larger safety margin.

The pressure during recovery appears to be the most important variable for the success of this method. Pressures below 0.01 mm. Hg are not practical to maintain because of increased pumping difficulty. In addition, it becomes necessary to employ refrigeration for the 1,2-crystallizer in order to avoid loss of catechol vapor through the pump in return for only a marginal, if any, further improvement in the efficiency of the recovery. Pressures above 10 mm. slow the rate of volatilization of products, or require higher volatilization temperatures, either which will increase the formation of tars from the products; however, pressures up to about 50 mm. can be effectively utilized. The preferred range of pressures is from about 0.1 to about 2 mm. Hg.

Too low a temperature for the crude concentrate decreases the amount of recovery of products, and too high a temperature produces a significant amount of tar from the products. Short heating times are advantageous if a large area for volatilization is provided. With smaller areas, longer heating times are necessary to permit adequate recovery of products but at the same time a greater amount of tar formation would occur. The temperature of the hydroquinone crystallizer is related to the overall pressure in the system. It must be adjusted such that it is low enough so that hydroquinone crystallizes out but high enough that catechol remains volatile and passes on to the catechol crystallizer.

The catechol crystallizer must be kept cool enough to prevent loss of catechol vapor through the pumping system.

The crude product concentrate heating schedule has operative temperature limits of from 10 to 300° C. with a preferred range of about 50° to about 200° C. The operative limits of the time for the crude product concentrate heating schedule is from about 1 minute to about 6 hours with a preferred range of from about 5 minutes to about 1 hour.

The hydroquinone crystallizer temperature has operative limits from about 30 to 170° C. with preferred range of about 80 to 110° C., while the catechol crystallizer temperature has operative limits from about −80 to 80° C. with a preferred range of from about 0 to about 60° C.

SPECIFIC EMBODIMENTS

To a stirred solution of phenol (188 g.; 2 moles) in distilled water (4 l.) in a polyethylene vessel fitted with a polyethylene cooling coil, was added ferric chloride ($FeCl_3 \cdot 6H_2O$) (1.35 g.; 5 mmoles) and catechol (0.55 g.; 5 mmoles). The solution was cooled to 15° C. and 30% $H_2O_2$ (92 ml.; 0.90 mole) was added within 20 seconds. The temperature rose to 28° C. After 10 minutes reaction time the temperature had dropped to 15° C. and no peroxide was left. The reaction mixture was then steam distilled until 2 liters of distillate was collected. Water was distilled, using a boiling water bath, from the remaining solution under reduced pressure to leave a thick, black residue. This residual mixture containing catechol and hydroquinone was sublimed through a steam-heated large bore condenser, in a vertical position, which caught the hydroquinone, thence via an electrically heated (120°

C.) connecting tube leading to a trap cooled at −70° C. into which the catechol and any residual solvent was condensed. The pot temperature was slowly raised from room temperature to 200° C. (approximately between 45 to 60 minutes) while the pressure in the system was kept at 1 mm. Hg. At about 50° C., the catechol began to sublime while hydroquinone started to come over at about 140–150° C. The flask was heated for about 2½ hours from 50° to 150° C. Analysis showed that the steam-heated condenser contained only hydroquinone while the trap contained catechol. The last traces of hydroquinone were then obtained from the concentrate by further 40 minute heating, raising the temperature from 150° to 195° C.

During this sublimation for product recovery, the hydroquinone trapped out at 100° while the catechol passed on to the cold trap. The catechol:hydroquinone ratio of 3:2 was obtained from the relative amounts of the two products trapped out.

The overall yield of the dihydroxybenzenes (catechol and hydroquinone) was 82–87% based on consumed phenol.

The solvent water and phenol may be recycled, thus avoiding a water pollution problem.

A practical mode of operation is to use 3 stages of scraped surface heat exchangers, the first, a volatilizer running on 150 p.s.i.g. steam at about 170° C. The overheads from this would then proceed to the second exchanger cooled by 15 p.s.i.g. steam (105° C.) where the hydroquinone is recovered, and the bottoms from the first exchanger, which would be coke-like material, discarded. The overheads of the second exchanger would pass on to the third, cooled by process water (15–25° C.) where the catechol would be recovered. Operation of all three at a pressure of 1 mm. Hg would make the indicated temperatures appropriate for the production of 99+% hydroquinone and 96% catechol. To operate the recovery unit at a significantly different pressure will require appropriate changes in the temperatures used in both the volatilizer and the two crystallizers.

To compare the recovery procedure of the instant invention with those recovered procedures of the prior art, eight references were examined and their recovery procedures followed. The results of these recovery procedures are tabulated in Table I, below, along with the recovery procedure described and claimed herein.

Reference 1, M. Martinon, Bull. Soc. Chim., France, ii, 43, 155 (1885), describes a recovery procedure whereby the residue is treated with aqueous lead acetate. The lead catecholate precipitate is then (1) acidified with $H_2SO_4$, (2) extracted with ether, (3) the ether is evaporated off and (4) leaving a distilled solid residue. The phenol/hydroquinone filtrate is discarded in this procedure.

Reference 2, O. J. Magidson and N. A. Preobraschenskii, Moscow, Nauk, Khim-Farm. Inst. Trudy, 16, 65–68 (1926), Chemische Zentral., 1, 35 (1928), describes a procedure where the crude solution is filtered, extracted with ether and the ether evaporated off. The solid residue is then distilled at atmospheric pressure to recover phenol, catechol and hydroquinone.

Reference 3, H. Goldhammer, Biochem. Z., 189, 81 (1927), describes a steam distillation of the crude reaction mixture to remove the unreacted phenol. The distillant is then extracted with ether to obtain only a dihydroxybenzene yield.

Reference 4a, A. Chwala and M. Pailer, J. Prakt. Chem., 152, 45 (1939), and Reference 4b idem, P. B. Report 74429, July 13, 1937, pp. 7245–7255, describe a procedure whereby the crude reaction mixture is steam distilled, the distillant extracted with ether and the ether evaporated off to leave a solid residue. The residue is then taken up in water and treated with aqueous lead acetate. The lead catecholate precipitate is then decomposed with aqueous HCl, the $PbCl_2$ precipitate is filtered off, treated with sodium bicarbonate, extracted with ether, the ether is evaporated off and the crude residue is distilled. The hydroquinone filtrate is extracted with ether, the ether evaporated off and the hydroquinone recrystallized.

Reference 5, H. B. Rickert, OS, Book 2, page 54, 1953, filters the crude reaction mixture, concentrates it to a volume of 40 ml. under reduced pressure, and then evaporates it to dryness at 70° C. at 760 mm. The mixture is then analyzed by infrared.

Reference 6, H. B. Rickert, OS, Book 8, pp. 115–118, 1954, adjusts the pH of the crude mixture to 6.5 with 55 ml. of 10% NaOH and filters. Water is removed by distillation and the residue then is distilled at 20 mm. Hg. No hydroquinone is isolated.

Reference 7, G. G. Henderson and R. Boyd, Chem. Soc. J., 97, 1659 (1910), describes a related reference wherein t-butylphenol is oxidized to tetrahydroxy-t-butylbenzene.

Reference 8 represents a phenol oxidation with hydrogen peroxide by the inventors, herein, wherein conventional solvent extraction procedure for initial product isolation was used. Product isolation from the crude reaction mixture was carried out by first steam distilling out the unreacted phenol and then using a water-insoluble solvent such as diethyl ether or methyl isobutyl ketone to extract the catechol and hydroquinone from the aqueous medium. The solvent was then distilled off and the remaining solid analyzed by N.M.R. and gas chromatography for yield and isomer ratio. For N.M.R. analysis the products were converted to their acetyl esters and for gas chromatography to their methyl ethers. As can be seen from Table I, the conditions of time and temperature and the amounts of reactant materials are closely parallel to Reference 9, below, except for the product isolation procedure.

Reference 9 is the phenol oxidation with hydrogen peroxide using the procedure described and claimed in the instant invention, the details of which are outlined in Example 1, above.

As can be seen from Table I, below, the dihydroxybenzene yield is significantly improved by the use of our sublimation technique. Moreover, the separation is effected in one step as opposed to the many steps described in the other eight references.

TABLE I.—PHENOL OXIDATIONS WITH HYDROGEN PEROXIDE

| Catalyst | | PhOH, moles | $H_2O_2$, moles | $H_2O$,[1] ml. | Reaction | | Phenol convers., percent | $Ph(OH)_2$ yield, percent | Catechol, hydroquinone | Ref. |
|---|---|---|---|---|---|---|---|---|---|---|
| Ion | Mmoles | | | | Temp., degrees | Time, hr. | | | | |
|  | 0 | 0.32 | 0.75 | 900 | 85 |  |  | ([2]) |  | 1 |
| $Fe^{+++}$ | 0.4 | 0.32 | 0.32 | 550 | 41 | 8 | 66 | 42 | 1.48 | 2 |
| $Fe^{+++}$ | 0.4 | 0.51 | 0.32 | 850 | 41 | 8 | 75 | 42 | 2.16 | 2 |
| $Fe^{++}$ | 10 | 0.11 | 0.11 | 300 | 25 | 24 |  | [3]55 | [3]2.2 | 3 |
| $Fe^{++}$ | 5 | 0.16 | 0.053 | 400 | 0 |  | 33 | 72 | 1.0 | 4 |
| $Fe^{++}$ | 1.3 | 0.213 | 0.213 | 320 | 80 | 2 |  | >5 | 1.0 | 5 |
| $Fe^{++}$ | 13 | 2.0 | 2.0 | 300 | 80 | 2 | 50 | 17 | [4]19.5 | 6 |
|  | 0 | 0.11 | 0.11 | HOAc | 25 | ≈80 | ≈100 | ([2]) |  | 7 |
| $Fe^{+++}$ | 5 | 2.0 | 1.20 | 4,000 | 15 | 0.83 | 26 | 64 | 1.3 | 8 |
| $Fe^{+++}$ | 5 | 2.0 | 0.90 | 4,000 | 15 | 0.17 | 26 | 87 | 1.5 | 9 |

[1] Based on 30% $H_2O_2$ used.
[2] Yes, plus quinone.
[3] Corrected figures from ref. 4b.
[4] Grams catechol, hydroquinone not isolated.

As indicated above, the sublimation technique is applied to a variety of phenolic compounds that have been oxidized to ortho- and para-dihydroxy compounds. Thus, 1,4-dihydroxymethylbenzene is separately recovered from its isomer 1,2-dihydroxymethylbenzene as is 1,4-dihydroxymethoxybenzene from its isomer 1,2-dihydroxymethoxybenzene, utilizing the process of the present invention to obtain superior yields.

It should be understood that the sublimation technique described and claimed herein may be app'ied to the separation of these ortho- and para-dihydroxy isomers regardless of the way in which the mixture was obtained.

We claim:

1. A method for separately recovering ortho- and para-dihydroxy isomers from a mixture thereof, the isomers selected from the group consisting of ortho- and para-dihydroxybenzene, ortho- and para-dihydroxymethylbenzene and ortho- and para-dihydroxymethoxybenzene, comprising volatilizing the isomers by heating said mixture gradually to a maximum of from about 10° to about 300° C. at from about 0.01 to about 50 mm. Hg pressure, serially condensing first the para-dihydroxy moiety at from about 30° to about 170° C. and then the ortho-dihydroxy at from −80° to 80° C.

2. The method of Claim 1 at a pressure of from about 0.1 to about 2 mm. Hg.

3. The method of Claim 1 wherein the dihydroxys separately recovered are catechol and hydroquinone.

4. The method of Claim 3 wherein the dihydroxy mixture is gradually heated to about 200° C. at a pressure of about 0.1 to about 2.0 mm. Hg, the hydroquinone is condensed and recovered separately at a temperature of from about 80° to about 110° C., and the catechol is then condensed and recovered at a temperature of from about 0° to 60° C.

5. The method of Claim 1 wherein the dihydroxy isomers separately recovered are 1,4-dihydroxy-3-methylbenzene and 1,2-dihydroxy-3-methylbenzene.

6. The method of Claim 1 wherein the dihydroxy isomers separately recovered are 1,4-dihydroxy-3-methoxybenzene and 1,2-dihydroxy-3-methoxybenzene.

References Cited

UNITED STATES PATENTS

| | | | |
|---|---|---|---|
| 3,055,949 | 9/1962 | Howk | 260—396 R |
| 898,980 | 9/1908 | Lowenstein | 203—87 |
| 3,355,503 | 11/1967 | Pino | 260—621 R |
| 2,715,145 | 8/1955 | Bewley | 260—627 G |
| 3,401,096 | 9/1968 | Wondrak | 203—87 |
| 1,446,551 | 2/1923 | Dissosway | 260—621 A |
| 3,620,928 | 11/1971 | Miserlis | 203—91 |

NORMAN YUDKOFF, Primary Examiner

H. H. BERNSTEIN, Assistant Examiner

U.S. Cl. X.R.

23—294; 203—91; 260—396, 621 A, 627 G